United States Patent
Nakaya et al.

(10) Patent No.: US 8,480,271 B2
(45) Date of Patent: Jul. 9, 2013

(54) VEHICLE LIGHT AND METHOD FOR CONTROLLING LIGHT DISTRIBUTION

(75) Inventors: Yoshiaki Nakaya, Tokyo (JP); Makio Matsuzaki, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 215 days.

(21) Appl. No.: 13/072,644

(22) Filed: Mar. 25, 2011

(65) Prior Publication Data

US 2011/0235349 A1 Sep. 29, 2011

(30) Foreign Application Priority Data

Mar. 25, 2010 (JP) ................................. 2010-070047

(51) Int. Cl.
*B60Q 1/00* (2006.01)
*F21V 1/00* (2006.01)

(52) U.S. Cl.
USPC ............................. 362/466; 362/507; 362/545

(58) Field of Classification Search
USPC .................. 362/460, 464–466, 507, 543–545
See application file for complete search history.

(56) References Cited

U.S. PATENT DOCUMENTS 7,520,645 B2 * 4/2009 Ishida ........................... 362/507
2009/0231866 A1 9/2009 Yamamura

FOREIGN PATENT DOCUMENTS

JP 2009-218155 A 9/2009

* cited by examiner

*Primary Examiner* — Jason Moon Han
(74) *Attorney, Agent, or Firm* — Kenealy Vaidya LLP

(57) ABSTRACT

A vehicle light can form a synthetic light distribution pattern with an area where a surrounding vehicle exists being made darker than an area(s) surrounding that area. The synthetic light distribution pattern can allow a sufficient illumination range and a center light intensity required for a running beam to be compatible. The vehicle light can also form a light distribution pattern with only an area where a farther surrounding vehicle exists is made dark. The vehicle light can form the light distribution pattern by overlaying a plurality of first nearby illumination areas, a plurality of first farther illumination areas, a plurality of second nearby illumination areas, and a plurality of second farther illumination areas with the respective illumination areas being divided in a horizontal direction and individually controlled in terms of light intensity so that respective vertical division lines of the illumination areas appear in predetermined order in the horizontal direction.

4 Claims, 14 Drawing Sheets

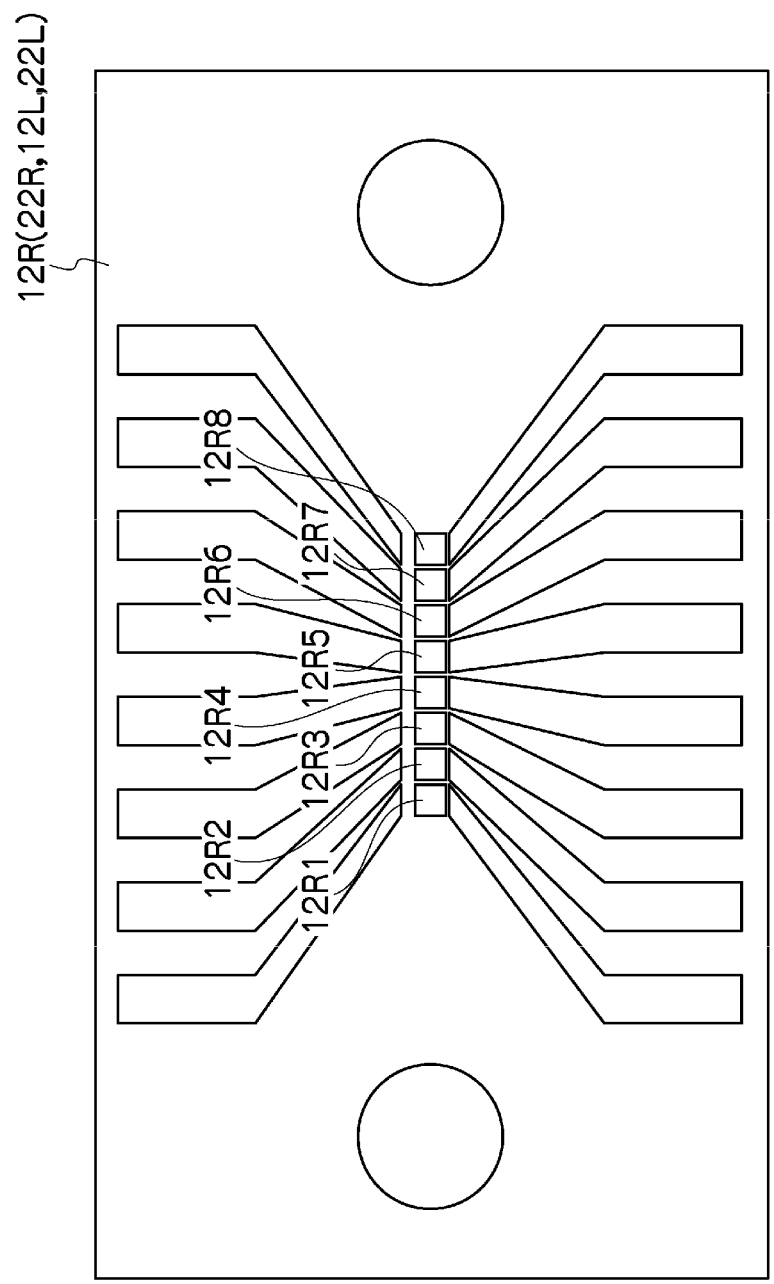

Synthetic Light Distribution (High Beam)

Synthetic Light Distribution (Oncoming Vehicle at 100 m)

VEHICLE LIGHT AND METHOD FOR CONTROLLING LIGHT DISTRIBUTION

This application claims the priority benefit under 35 U.S.C. §119 of Japanese Patent Application No. 2010-070047 filed on Mar. 25, 2010, which is hereby incorporated in its entirety by reference.

TECHNICAL FIELD

The presently disclosed subject matter relates to a vehicle light and a method for controlling light distribution of a vehicle light, and in particular, to a vehicle light that can utilize a plurality of LED light sources and a method for controlling light distribution of such a vehicle light.

BACKGROUND ART

Conventional vehicle lights capable of forming a specific light distribution pattern have been proposed in which the specific light distribution pattern can have a darker area where a surrounding vehicle exists in order to prevent glare light from reaching the surrounding vehicles, such as oncoming vehicles, leading vehicles and the like (see, for example, Japanese Patent Application Laid-Open No. 2009-218155 and its corresponding U.S. Patent Application Publication No. 2009/231866A1).

As shown in FIGS. 1A and 1B, Japanese Patent Application Laid-Open No. 2009-218155 discloses a vehicle light having a plurality of light emitting devices 210R1 to 210R5 (FIG. 1A) and another plurality of light emitting devices 220L1 and 220L4 (FIG. 1B) that are horizontally arranged side by side and can be individually controlled (lighted).

The vehicle light can project light source images from the plurality of light emitting devices 210R1 to 210R5 and 220L1 to 220L4 while those images are enlarged by a projection lens (not shown). Specifically, as shown in FIG. 2, the vehicle light can project the light source images to form a plurality of first areas PAR1 to PAR5 and another plurality of second areas PAL1 to PAL4 that are horizontally separated and are individually controlled in terms of light intensity. These plurality of areas PAR1 to PAR5 to PAL1 to PAL4 can be overlaid with each other to form a single addition light distribution pattern PA while vertical division lines LR and LL alternately appears in the light distribution pattern PA as shown in FIG. 2.

In a vehicle light with the above configuration, a particular light emitting device(s) can be turned off or controlled in light intensity in order for the vehicle light to form a desired light distribution pattern having a darker area where a surrounding vehicle exists (see the solid black area in FIG. 2). However, as the first areas PAR1 to PAR5 and the second areas PAL1 to PAL4 have the same size, the illumination range and center light intensity required for a running beam (or a so-called high beam) cannot be compatible.

In view of the desire to prevent glare light from reaching surrounding vehicles, it would be suitable to make a darkened area where a surrounding vehicle exists. However, when the surrounding vehicle is located at a farther position as shown in the leftmost column in FIG. 2 (first position), the above vehicle light may form a light distribution pattern with the darkened areas at the center and its surrounding positions. Accordingly, the darkened area may be larger than the actual area (or desired area) with respect to the surrounding vehicle.

SUMMARY

The presently disclosed subject matter was devised in view of these and other problems and features and in association with the conventional art. According to an aspect of the presently disclosed subject matter, a vehicle light can form a light distribution pattern with a darkened area where a surrounding or neighboring vehicle exists while a sufficient illumination area and center light intensity required for a high beam light distribution is still accomplished. Furthermore, the vehicle light can form a light distribution pattern with a darkened area that only corresponds to the area where a surrounding vehicle exists. Specifically, the vehicle light can form a light distribution pattern with the darkened area that does not include areas that are adjacent to the area where the surrounding vehicle exists.

According to another aspect of the presently disclosed subject matter, a vehicle light can be configured to form a synthetic light distribution pattern including a plurality of first nearby illumination areas that are divided horizontally and are individually controlled in terms of light intensity, a plurality of first farther illumination areas that are divided horizontally to have a smaller size than the first nearby illumination areas and which are individually controlled in terms of light intensity, a plurality of second nearby illumination areas that are divided horizontally and are individually controlled in terms of light intensity, and a plurality of second farther illumination areas that are divided horizontally to have a smaller size than the second nearby illumination areas and are individually controlled in terms of light intensity, the first nearby illumination areas, the first farther illumination areas, the second nearby illumination areas, and the second nearby illumination areas being overlaid with one another so that respective vertical division lines of the illumination areas appear in predetermined order in the horizontal direction.

The vehicle light with the above configuration can form a light distribution pattern which is darker in an area near surrounding vehicles. This may be accomplished by turning off a light (or reducing a light intensity) with respect to a specific illumination area by the action of the first nearby illumination areas, the first farther illumination areas, the second nearby illumination areas, and the second nearby illumination areas being overlaid with one another so that respective vertical division lines of the illumination areas appear in predetermined order in the horizontal direction.

Furthermore, the vehicle light with the above configuration can illuminate a wide area from a farther side to a nearby side by the action of the first nearby illumination areas and the second nearby illumination areas while the vehicle light can be a narrow range at the farther side by the action of the first farther illumination areas and the second farther illumination areas that are smaller in size than the first nearby illumination areas and the second nearby illumination areas. Accordingly, the synthetic light distribution pattern can allow the sufficient illumination range and center light intensity required for a running beam to be compatible.

Furthermore, the vehicle light with the above configuration can form a light distribution pattern which is dark in a region of a surrounding vehicle which is located at a further distance by the action of the first farther illumination areas and the second farther illumination areas that are smaller in size than the first nearby illumination areas and the second nearby illumination areas. Specifically, the vehicle light with the above configuration can prevent areas other than the area where a farther surrounding vehicle exists from being darkened.

The vehicle light with the above configuration can form a light distribution pattern with an area where a surrounding vehicle exists being made darker than an area(s) surrounding that area. The synthetic light distribution pattern can allow a sufficient illumination range and a center light intensity required for a running beam to be compatible. The vehicle light with the above configuration can also form a light distribution pattern with only an area where a farther surrounding vehicle exists is made dark. Specifically, the vehicle light with the above configuration can prevent areas other than the area where a farther surrounding vehicle exists from being darkened.

According to still another aspect of the presently disclosed subject matter, the vehicle light with the above configuration can include a first nearby illumination unit configured individually to control the light intensities of light beams for illuminating the respective first nearby illumination areas, a first farther illumination unit configured individually to control the light intensities of light beams for illuminating the respective first farther illumination areas, a second nearby illumination unit configured individually to control the light intensities of light beams for illuminating the respective second nearby illumination areas, and a second farther illumination unit configured individually to control the light intensities of light beams for illuminating the respective second farther illumination areas.

The vehicle light with the above configuration can form a light distribution pattern with an area where a surrounding vehicle exists being made darker than an area(s) surrounding that area by turning off a light. Accordingly, the synthetic light distribution pattern can allow the sufficient illumination range and center light intensity required for a running beam to be compatible. The vehicle light with the above configuration can also form the light distribution pattern with only an area where a farther surrounding vehicle exists being made dark. Specifically, the vehicle light with the above configuration can prevent areas other than the area where a farther surrounding vehicle exists from being darkened.

According to still another aspect of the presently disclosed subject matter, the vehicle light with the above configuration can include a control unit, and the first nearby illumination unit can include a plurality of first LED chips that are disposed horizontally and serve as light sources that are individually controlled for activation, and a first projection lens that is disposed in front of the plurality of first LED chips and can project light source images of the first LED chips magnified by a first magnifying power. Furthermore, the first farther illumination unit can include a plurality of second LED chips that are disposed horizontally and serve as light sources that are individually controlled for activation, and a second projection lens that is disposed in front of the plurality of second LED chips and can project light source images of the second LED chips magnified by a second magnifying power smaller than the first magnifying power. In addition, the second nearby illumination unit can include a plurality of third LED chips that are disposed horizontally and serve as light sources that are individually controlled for activation, and a third projection lens that is disposed in front of the plurality of third LED chips and can project light source images of the third LED chips magnified by the first magnifying power. Furthermore, the second farther illumination unit can include a plurality of fourth LED chips that are disposed horizontally and serve as light sources that are individually controlled for activation, and a fourth projection lens that is disposed in front of the plurality of fourth LED chips and can project light source images of the fourth LED chips magnified by the second magnifying power. In this configuration, the control unit can individually control the plurality of first LED chips, the plurality of second LED chips, the plurality of third LED chips and the plurality of fourth LED chips.

A vehicle light with the above configuration can illuminate the first farther illumination areas and the second farther illumination areas by the action of the second projection lens and the fourth projection lens having a second magnifying power that is smaller than the first magnifying power. Accordingly, the vehicle light can form the synthetic light distribution pattern with the higher center light intensity suitable for a running beam.

As described above, a vehicle light with the above configuration can form a synthetic light distribution pattern with an area where a surrounding vehicle exists being made darker than an area(s) surrounding that area. The synthetic light distribution pattern can allow a sufficient illumination range and center light intensity required for a running beam to be compatible. The vehicle light with the above configuration can also form a light distribution pattern with only an area where a farther surrounding vehicle exists being made dark. Specifically, the vehicle light with the above configuration can prevent areas other than the area where a farther surrounding vehicle exists from being darkened.

BRIEF DESCRIPTION OF DRAWINGS

These and other characteristics, features, and advantages of the presently disclosed subject matter will become clear from the following description with reference to the accompanying drawings, wherein:

FIG. 8 is a front view of an LED mounting substrate;

DESCRIPTION OF EXEMPLARY EMBODIMENTS

A description will now be made below to vehicle lights, in particular, vehicle light distribution control systems of the presently disclosed subject matter with reference to the accompanying drawings in accordance with exemplary embodiments.

Figure 3:
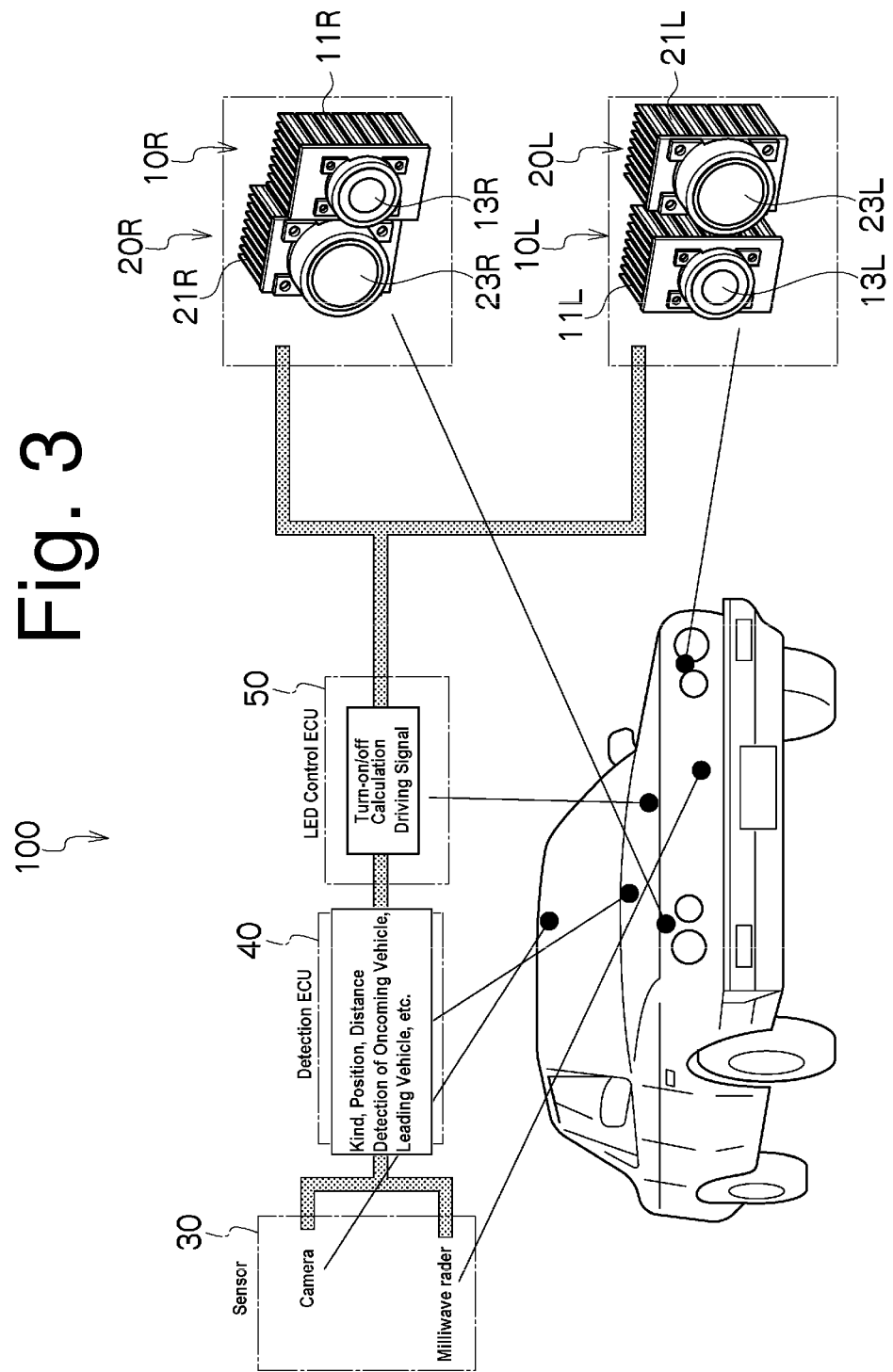
FIG. 3 is a diagram illustrating the system configuration of a vehicle light distribution control system made in accordance with principles of the presently disclosed subject matter.
Figure 4:
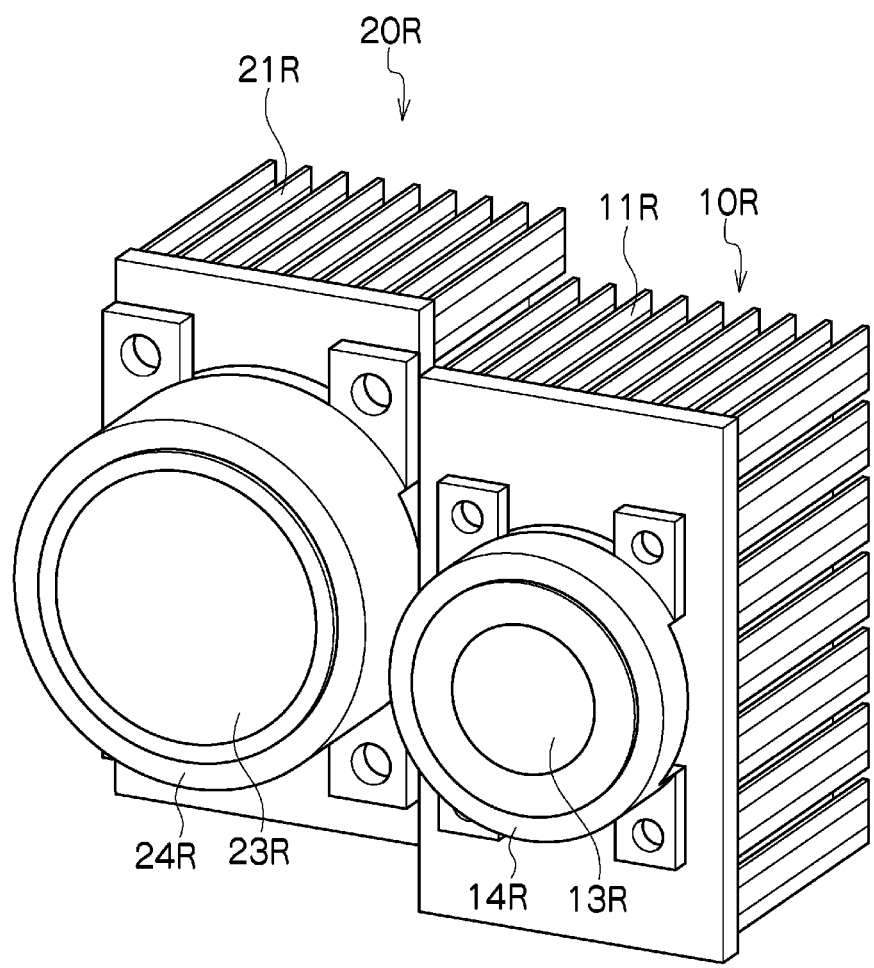
FIG. 4 is a perspective view illustrating an exemplary first nearby illumination unit and an exemplary first farther illumination unit.
Figure 5:
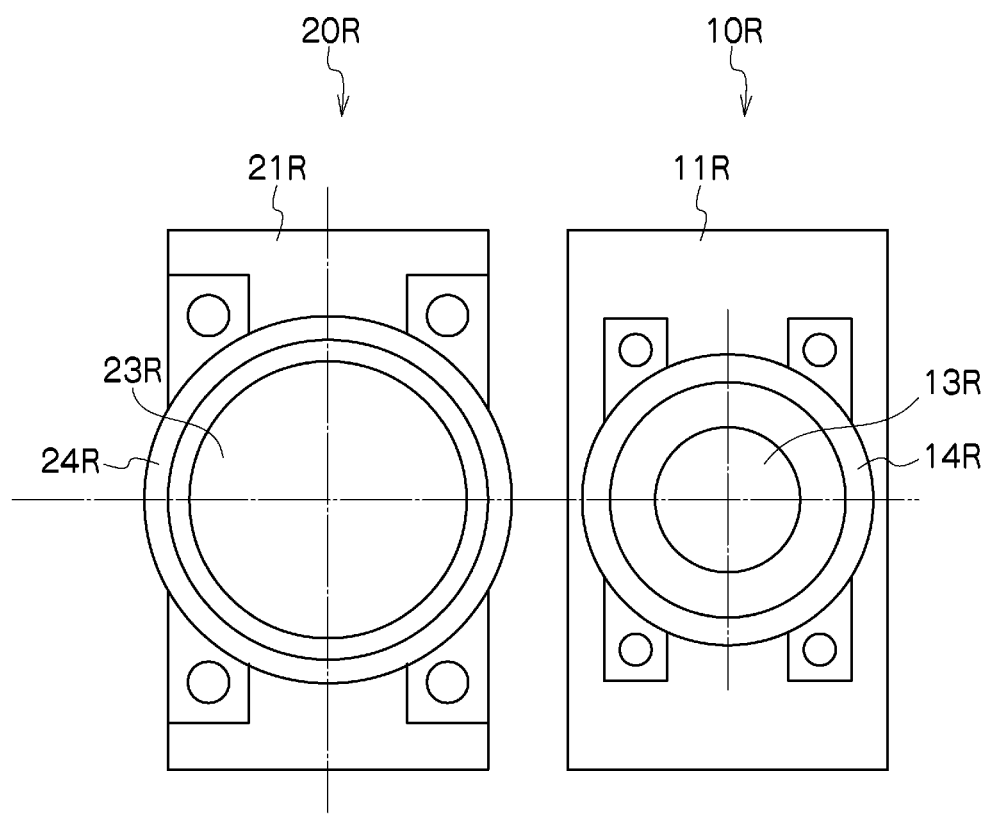
FIG. 5 is a front view illustrating the first nearby illumination unit and the first farther illumination unit of FIG. 4.
Figure 6:
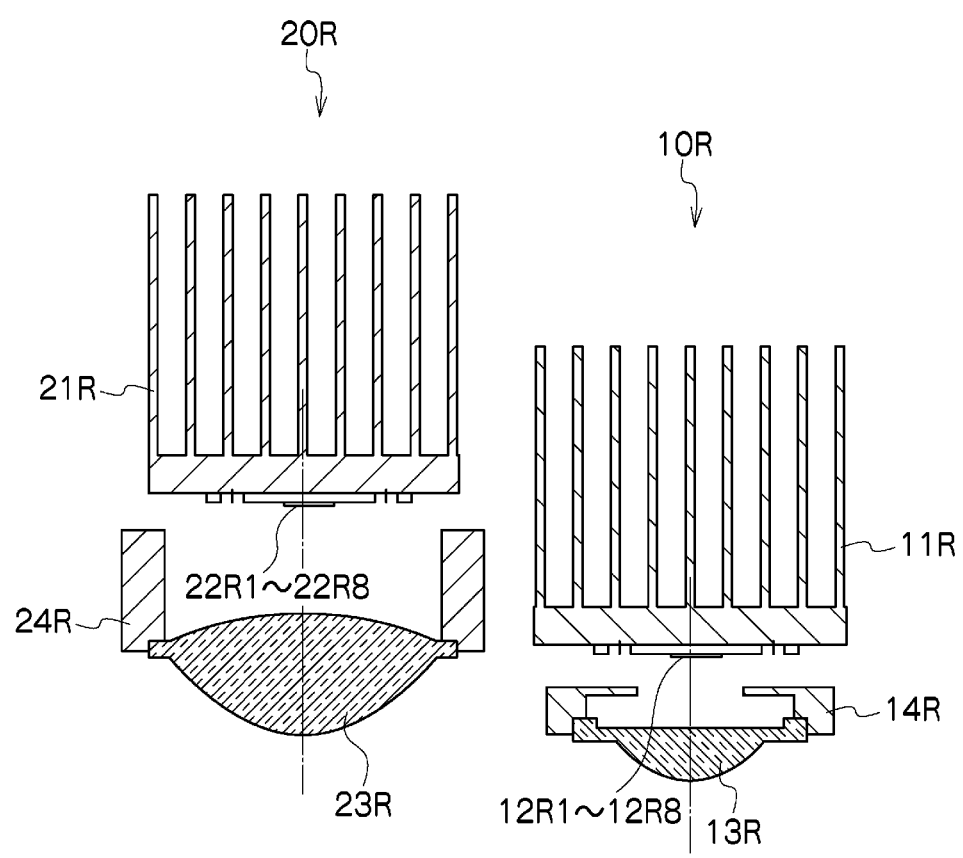
FIG. 6 is a top plan view illustrating the first nearby illumination unit and the first farther illumination unit of FIG. 4.

A vehicle light distribution control system 100 can be applied to a vehicle headlamp. As shown in FIG. 3, the vehicle light distribution control system 100 can include a pair of optical units disposed, for example, in a right front portion of a vehicle body. The optical unit can include a first nearby illumination unit 10R and a first farther illumination unit 20R. In addition, the vehicle light distribution control system 100 can include a pair of optical units disposed in a left front portion of a vehicle body. The optical unit can include a second nearby illumination unit 10L and a second farther illumination unit 20L. Furthermore, the vehicle light distribution control system 100 can include a sensor 30, a detection ECU 40, and an LED control ECU 50, and the like.

As shown in FIGS. 4 to 7, the first nearby illumination unit 10R can include a heat sink 11R, a plurality of first LED chips 12R1 to 12R8, a first projection lens 13R disposed in front of the plurality of first LED chips 12R1 to 12R8, and the like.

Figure 7:
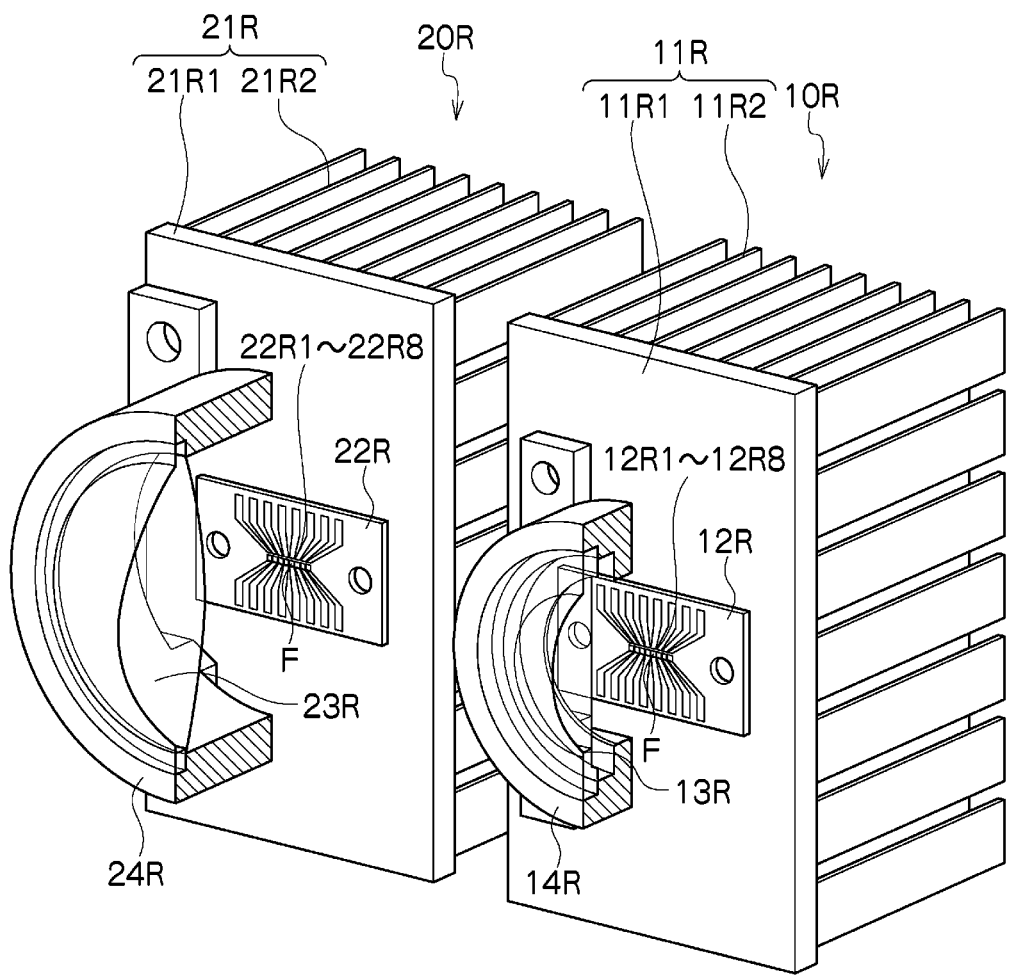
FIG. 7 is a partially cut-away perspective view illustrating the first nearby illumination unit and the first farther illumination unit of FIG. 4.

The heat sink 11R can be a member for dissipating heat generated by the emission of light by the plurality of first LED chips 12R1 to 12R8. As shown in FIG. 7, the heat sink 11R can include a base plate 11R1 disposed at the front side of the vehicle body and a heat dissipation fin 11R2 disposed at the rear side of the vehicle body.

As shown in FIGS. 7 and 8, the plurality of first LED chips 12R1 to 12R8 can be horizontally disposed in a line on a first LED mounting substrate 12R. The first LED mounting substrate 12R can be firmly screwed to the base plate 11R1 while the rear substrate portions of the plurality of first LED chips 12R1 to 12R8 are in contact with (or face toward) the base plate 11R1 (see FIG. 7). The plurality of first LED chips 12R1 to 12R8 can be electrically connected to the LED control ECU 50 via a wiring pattern. The LED control ECU 50 can individually control the plurality of first LED chips 12R1 to 12R8. Specifically, the plurality of first LED chips 12R1 to 12R8 can be turned on/off in accordance with the control of the LED control ECU 50.

The first projection lens 13R can be disposed in front of the plurality of first LED chips 12R1 to 12R8 in order to illuminate the areas ranging from the farther area to the nearby area. The first projection lens 13R can magnify the light source images of the plurality of first LED chips 12R1 to 12R8 by a first magnifying power (see FIG. 7). The first projection lens 13R can have a focus F that is disposed at or near the plurality of first LED chips 12R1 to 12R8. The first projection lens 13R can be supported by a lens holder 14R firmly screwed onto the base plate 11R1.

Figure 9A:
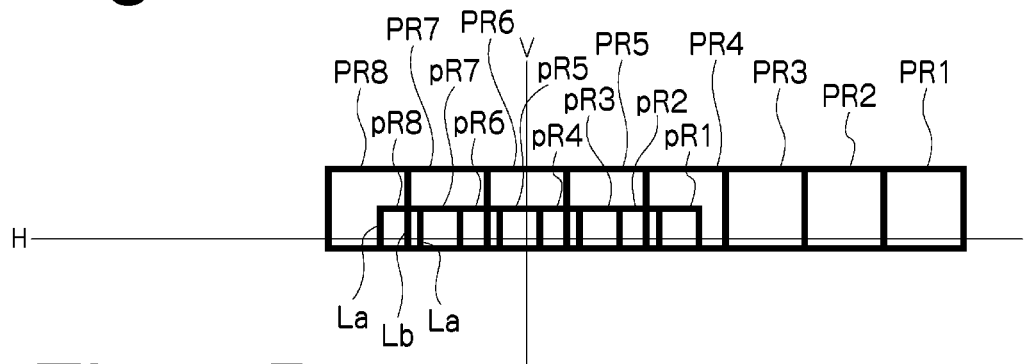
FIG. 9A is a light distribution diagram illustrating an example of a plurality of first nearby illumination areas PR1 to PR8 and a plurality of first farther illumination areas pR1 to pR8 formed by a first nearby illumination unit.
Figure 10A:
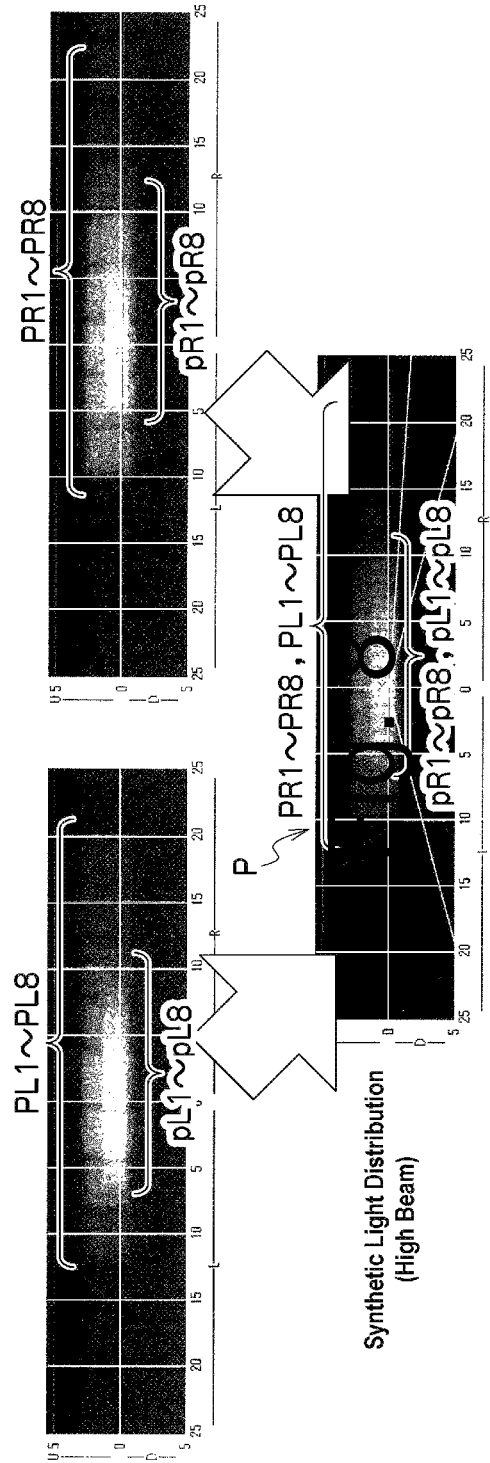
FIG. 10A is a diagram showing an example of a light distribution pattern formed by the respective units 10R, 20R, 10L and 20L.
Figure 10B:
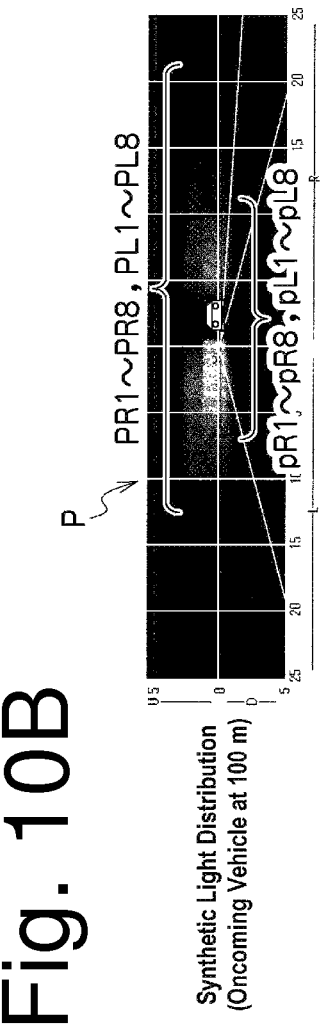
FIG. 10B is a diagram showing a synthetic light distribution pattern P with a darker area than surrounding areas.

The first nearby illumination unit 10R with the above configuration can magnify and project the light source images of the plurality of first LED chips 12R1 to 12R8 by the first magnifying power utilizing the first projection lens 13R. The projected light beams can form a plurality of first nearby illumination areas PR1 to PR8 on a virtual vertical screen assumed to be disposed at a predetermined position (approx. 25 m) in front of the vehicle light. The light intensities of the horizontally divided first nearby illumination areas PR1 to PR8 can be controlled so that the areas PR1 to PR8 can constitute a horizontally wide light distribution pattern that is part of the high beam light distribution pattern (see FIGS. 9A and 10A). Accordingly, the vehicle light with the above configuration can illuminate the wide areas ranging from the farther area to the nearby area with light beams.

As shown in FIGS. 4 to 7, the first farther illumination unit 20R can include a heat sink 21R, a plurality of second LED chips 22R1 to 22R8, a second projection lens 23R disposed in front of the plurality of second LED chips 22R1 to 22R8, and the like.

The heat sink 21R can be a member for dissipating heat generated by the emission of light by the plurality of second LED chips 22R1 to 22R8. As shown in FIG. 7, the heat sink 21R can include a base plate 21R1 disposed at the front side of the vehicle body and a heat dissipation fin 21R2 disposed at the rear side of the vehicle body.

The plurality of second LED chips 22R1 to 22R8 can be horizontally disposed in line on a second LED mounting substrate 22R in the same manner as the plurality of first LED chips 12R1 to 12R8. The second LED mounting substrate 22R can be firmly screwed to the base plate 21R1 while the rear substrate portions of the plurality of second LED chips 22R1 to 22R8 are in contact with (or face toward) the base plate 21R1 (see FIG. 7). The plurality of second LED chips 22R1 to 22R8 can be electrically connected to the LED control ECU 50 via a wiring pattern. The LED control ECU 50 can individually control the plurality of second LED chips 22R1 to 22R8. Specifically, the plurality of second LED chips 22R1 to 22R8 can be turned on/off in accordance with the control of the LED control ECU 50.

The second projection lens 23R can be disposed in front of the plurality of second LED chips 22R1 to 22R8 in order to illuminate the narrow farther area. The second projection lens 23R can magnify the light source images of the plurality of second LED chips 22R1 to 22R8 by a second magnifying power that is smaller than the first magnifying power (the second magnifying power is approx. 1:4 in area) (see FIG. 7). The second projection lens 23R can have a focus F that is disposed at or near the plurality of second LED chips 22R1 to 22R8. The second projection lens 23R can be supported by a lens holder 24R that can be firmly screwed onto the base plate 21R1.

The first farther illumination unit 20R with the above configuration can magnify and project the light source images of the plurality of second LED chips 22R1 to 22R8 by the second magnifying power utilizing the second projection lens 23R. The projected light beams can form a plurality of first farther illumination areas pR1 to pR8 on the virtual vertical screen. The light intensities of the horizontally divided first farther illumination areas pR1 to pR8 can be controlled so that the areas pR1 to pR8 can constitute a spot light distribution pattern that is another part of the high beam light distribution pattern (see FIGS. 9A and 10A). Accordingly, the vehicle light with the above configuration can provide a maximum light intensity at a certain farther area or region sufficient for forming the high beam light distribution pattern.

The second nearby illumination unit 10L can have the same configuration as that of the first nearby illumination unit 10R while the unit 10L is symmetrical to the unit 10R.

The second nearby illumination unit 10L can include a heat sink 11L, a plurality of third LED chips 12L1 to 12L8, a third projection lens 13L disposed in front of the plurality of third LED chips 12L1 to 12L8, and the like.

The heat sink 11L can be a member for dissipating heat generated by the emission of light by the plurality of third LED chips 12L1 to 12L8. The heat sink 11L can include a base plate 11L1 disposed at the front side of the vehicle body and a heat dissipation fin 11L2 disposed at the rear side of the vehicle body.

A plurality of LED chips 12L1 to 12L8 can be horizontally disposed in line on a third LED mounting substrate 12L. The third LED mounting substrate 12L can be firmly screwed to the base plate 11L1 while the rear substrate portions of the plurality of third LED chips 12L1 to 12L8 are in contact with (or face toward) the base plate 11L1. The plurality of third LED chips 12L1 to 12L8 can be electrically connected to the LED control ECU 50 via a wiring pattern. The LED control ECU 50 can individually control the plurality of third LED chips 12L1 to 12L8. Specifically, the plurality of third LED chips 12L1 to 12L8 can be turned on/off in accordance with the control of the LED control ECU 50.

The third projection lens 13L can be disposed in front of the plurality of third LED chips 12L1 to 12L8 in order to illuminate the areas ranging from the farther area to the nearby area. The third projection lens 13L can magnify the light source images of the plurality of third LED chips 12L1 to 12L8 by the first magnifying power. The third projection lens 13L can have a focus F that is disposed at or near the plurality of third LED chips 12L1 to 12L8. The third projection lens 13L can be supported by a lens holder 14L firmly screwed onto the base plate 11L1.

The second nearby illumination unit 10L with the above configuration can magnify and project the light source images of the plurality of third LED chips 12L1 to 12L8 by the first magnifying power utilizing the third projection lens 13L. The projected light beams can form a plurality of second nearby illumination areas PL1 to PL8 on the virtual vertical screen assumed to be disposed at a predetermined position (approx. 25 m) in front of the vehicle light. The light intensities of the horizontally divided second nearby illumination areas PL1 to PL8 can be controlled so that the areas PL1 to PL8 can constitute a horizontally wide light distribution pattern that is part of the high beam light distribution pattern (see FIGS. 9B and 10A). Accordingly, the vehicle light with the above configuration can illuminate the wide areas ranging from the farther area to the nearby area with light beams.

The second farther illumination unit 20L can have the same configuration as that of the first farther illumination unit 20R while the unit 20L is symmetrical to the unit 20R.

The second farther illumination unit 20L can include a heat sink 21L, a plurality of fourth LED chips 22L1 to 22L8, a fourth projection lens 23L disposed in front of the plurality of fourth LED chips 22L1 to 22L8, and the like.

The heat sink 21L can be a member for dissipating heat generated by the emission of light by the plurality of fourth LED chips 22L1 to 22L8. The heat sink 21L can include a base plate 21L1 disposed at the front side of the vehicle body and a heat dissipation fin 21L2 disposed at the rear side of the vehicle body.

The plurality of fourth LED chips 22L1 to 22L8 can be horizontally disposed in line on a fourth LED mounting substrate 22L in the same manner as the plurality of third LED chips 12L1 to 12L8. The fourth LED mounting substrate 22L can be firmly screwed to the base plate 21L1 while the rear substrate portions of the plurality of fourth LED chips 22L1 to 22L8 are in contact with (or face to) the base plate 21L1. The plurality of fourth LED chips 22L1 to 22L8 can be electrically connected to the LED control ECU 50 via a wiring pattern. The LED control ECU 50 can individually control the plurality of fourth LED chips 22L1 to 22L8. Specifically, the plurality of fourth LED chips 22L1 to 22L8 can be turned on/off in accordance with the control of the LED control ECU 50.

The fourth projection lens 23L can be disposed in front of the plurality of fourth LED chips 22L1 to 22L8 in order to illuminate a narrow farther area. The fourth projection lens 23L can magnify the light source images of the plurality of fourth LED chips 22L1 to 22L8 by the second magnifying power that is smaller than the first magnifying power (the second magnifying power is approx. 1:4 in area). The fourth projection lens 23L can have a focus F that is disposed at or near the plurality of fourth LED chips 22L1 to 22L8. The fourth projection lens 23L can be supported by a lens holder 24L firmly screwed onto the base plate 21L1.

The second farther illumination unit 20L with the above configuration can magnify and project the light source images of the plurality of fourth LED chips 22L1 to 22L8 by the second magnifying power utilizing the fourth projection lens 23L. The projected light beams can form a plurality of second farther illumination areas pL1 to pL8 on the virtual vertical screen. The light intensities of the horizontally divided second farther illumination areas pL1 to pL8 can be controlled so that the areas pL1 to pL8 can constitute a spot light distribution pattern that is another part of the high beam light distribution pattern (see FIGS. 9B and 10A). Accordingly, a vehicle light with the above configuration can provide a maximum light intensity at a certain farther area sufficient for forming the high beam light distribution pattern.

Figure 9B:
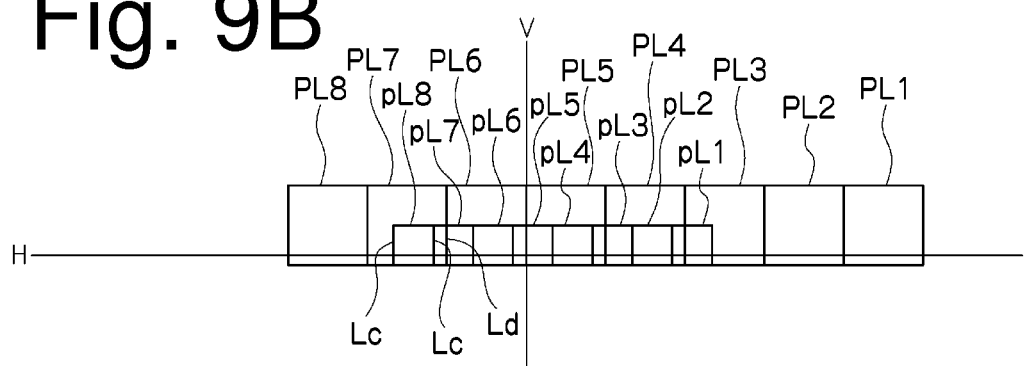
FIG. 9B is a light distribution diagram illustrating an example of a plurality of second nearby illumination areas PL1 to PL8 and a plurality of second farther illumination areas pL1 to pL8 formed by a second nearby illumination unit.
Figure 9C:
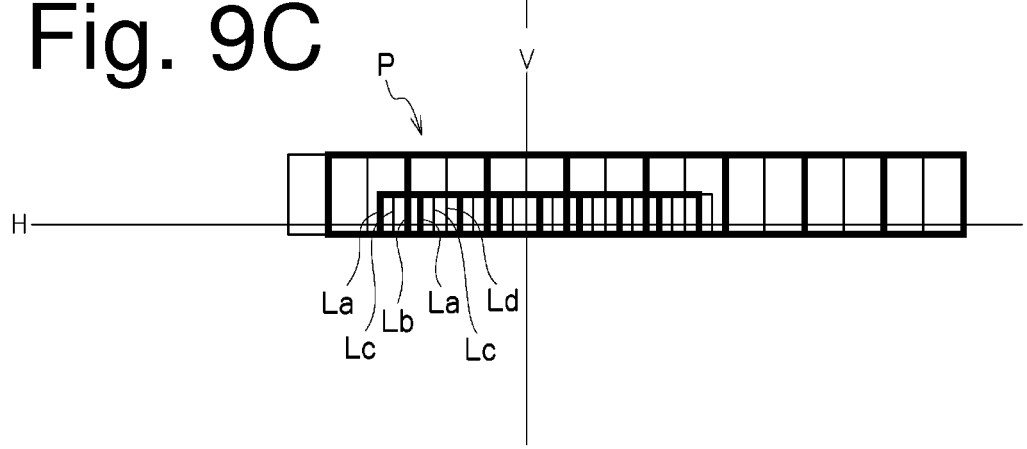
FIG. 9C is a light distribution diagram illustrating a synthetic light distribution pattern P formed by overlaying the illumination areas PR1 to PR8, pR1 to pR8, PL1 to PL8, and pL1 to pL8 so that respective vertical division lines La, Lb, Lc, and Ld appear in predetermined order in the horizontal direction.

The respective illumination areas PR1 to PR8, pR1 to pR8, PL1 to PL8, and pL1 to pL8 can be overlaid with one another so that respective vertical division lines La, Lb, Lc, and Ld of the illumination areas appear in predetermined order in the horizontal direction (see FIG. 9C).

Specifically, with reference to FIG. 9C, the respective illumination areas PR1 to PR8, pR1 to pR8, PL1 to PL8, and pL1 to pL8 can be overlaid with one another so that the vertical division lines La of the first farther illumination areas pR1 to pR8, the vertical division lines Lc of the second farther illumination areas pL1 to pL8, the vertical division lines Lb of the first near-by illumination areas PR1 to PR8, the vertical division lines La of the first farther illumination areas pR1 to pR8, the vertical division lines Lc of the second farther illumination areas pL1 to pL8, and the vertical division lines Lc of the second near-by illumination areas PL1 to PL8 can appear in this order in the horizontal direction repeatedly. This arrangement can be achieved by adjusting respective optical axes of the units 10R, 20R, 10L, and 20L.

The vehicle light with the above configuration can form a synthetic light distribution pattern P with an area being made darker than an area(s) surrounding that area by turning off a light (or reducing a light intensity) from a particular LED chip(s).

Figure 11A:
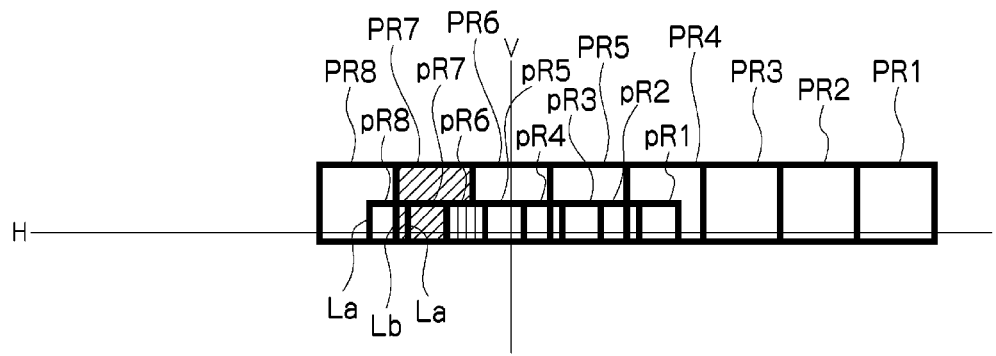
FIG. 11A is a light distribution diagram where the first nearby illumination area PR7 and the first farther illumination area pR6 are not illuminated (or illuminated with light with reduced intensity light) out of the illumination areas shown in FIG. 9A.
Figure 11B:
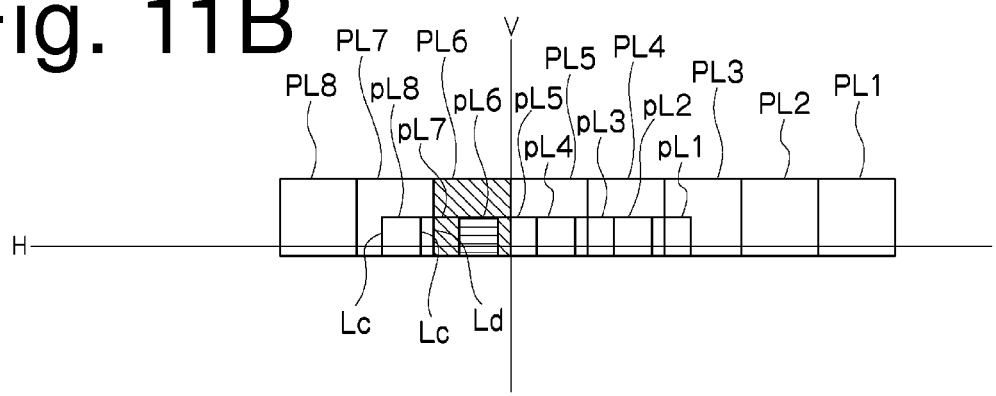
FIG. 11B is a light distribution diagram where the second nearby illumination area PL6 and the second farther illumination area pL6 are not illuminated (or illuminated with light with reduced intensity light) out of the illumination areas shown in FIG. 9B.
Figure 12:
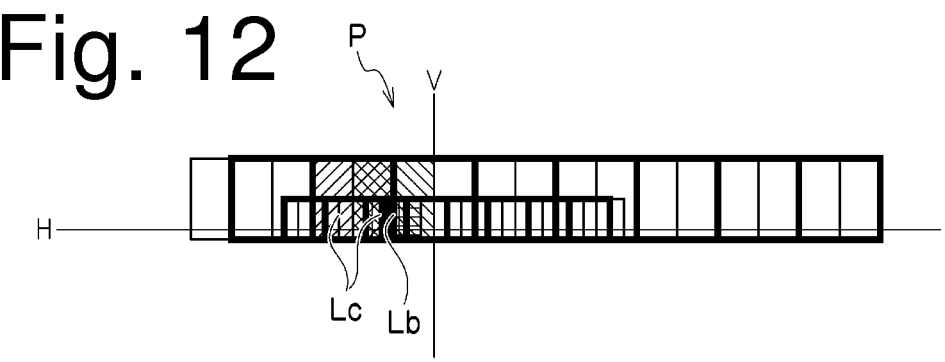
FIG. 12 is a diagram showing a synthetic light distribution pattern P formed by the turning-off (or lower intensity) light as shown in FIGS. 9A and 9B.

As an example, assuming an instance where the LED chips corresponding to the first nearby illumination area PR7 and the first farther illumination area pR6 are turned off (or reduced in light intensity) as shown FIG. 11A and the LED chips corresponding to the second nearby illumination area PL6 and the second farther illumination area pL6 are turned off (or reduced in light intensity) as shown FIG. 11B. In this case, as shown in FIG. 12, a synthetic light distribution pattern P can be formed in which a particular area (solid black area in FIG. 12) can be made darker than its surrounding areas.

Figure 13:
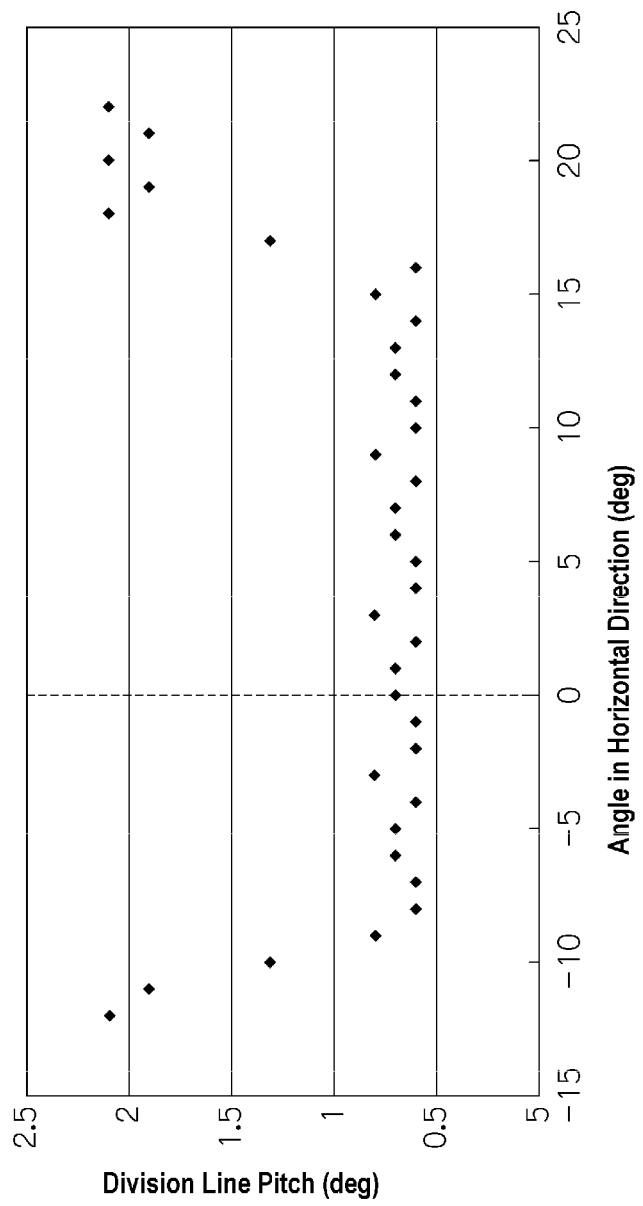
FIG. 13 is a graph obtained by plotting a pitch (distance between the adjacent vertical division lines) with respect to the horizontal angle in a coordinate system with a horizontal axis representing the horizontal angle and a vertical axis representing the pitch.

It should be noted that the vertical division lines La, Lb, Lc, and Ld can be disposed at predetermined intervals (pitch), for example, as shown in FIG. 13. FIG. 13 is a graph obtained by plotting a pitch (distance between the adjacent vertical division lines) with respect to the horizontal angle (widthwise direction of a vehicle) in a coordinate system with a horizontal axis representing the horizontal angle and a vertical axis representing the pitch. With this configuration, the farther illumination areas can be darkened by setting fine pitches while the nearby illumination areas can be darkened by setting coarse pitches. In this manner, the vehicle light can form the light distribution pattern with only an area where a farther surrounding vehicle exists being made dark. Specifically, the vehicle light can prevent areas other than the area where a farther surrounding vehicle exists from being darkened.

A sensor 30 can detect various data regarding vehicles existing in the illumination directions of the respective units 10R, 20R, 10L and 20L. For example, as shown in FIG. 3, the sensor 30 can be an imaging device (camera) configured to capture images including surrounding vehicles such as an oncoming vehicle, a leading vehicle, and the like, a milliwave radar configured to detect a distance to the surrounding vehicles and the like. As shown in FIG. 3, the sensor 30 can be electrically connected to the detection ECU 4 via a predetermined interface (not shown).

The detection ECU 40 can include an operation and controlling unit such as an MPU, a CPU, and the like and a memory unit such as a RAM, a ROM, and the like (not shown). If the operation and controlling unit executes predetermined programs read in the memory unit, the detection ECU 40 can function as an acquisition unit configured to acquire data regarding vehicles from the sensor 30, an operation unit configured to operate the positions of the oncoming vehicle, the leading vehicle, and the like, the distances from itself to the oncoming vehicle, leading vehicle, and the like (which will be described later). The detection ECU 40 can be electrically connected to the LED control ECU 50 via a predetermined interface as shown in FIG. 3.

The LED control ECU 50 can include an operation and controlling unit such as an MPU, a CPU, and the like and a memory unit such as a RAM, a ROM, and the like (not shown). If the operation and controlling unit executes predetermined programs read in the memory unit, the LED control ECU 50 can function as a data generation unit configured to generate designation data for designating an LED chip(s) to be lit (or to be turned off) on the basis of the operation results derived from the detection ECU 40, a control unit configured to individually control the plurality of LED chips 12R1 to 12R8, 22R1 to 22R8, 12L1 to 12L8, and 22L1 to 22L8 on the basis of the designation data generated to turn on (or off) these LED chips independently (which will be described later).

Figure 14:
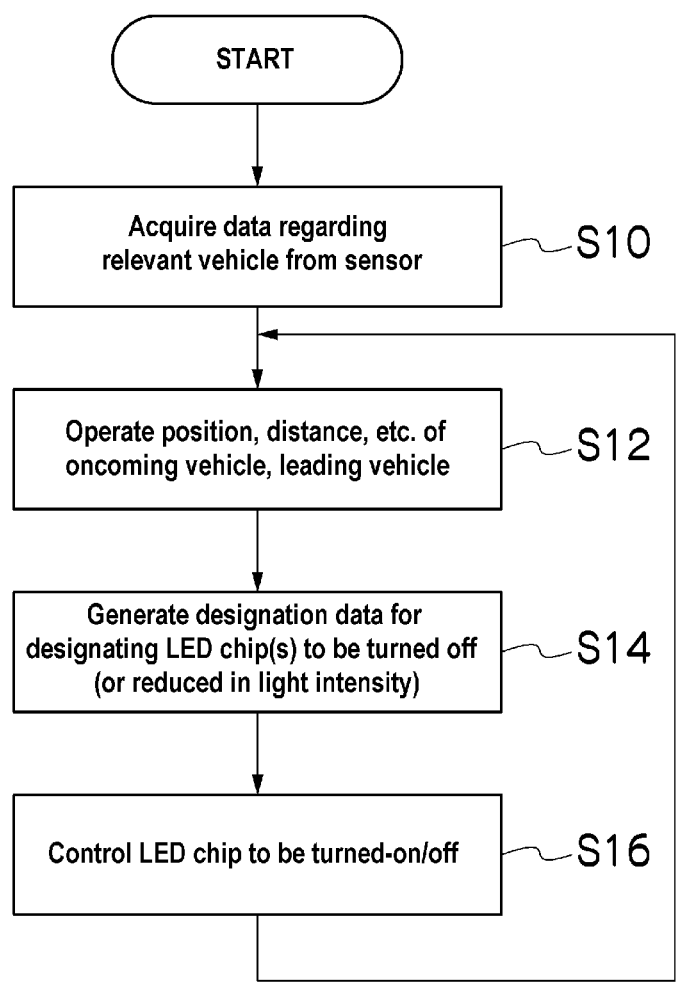
FIG. 14 is a flowchart showing an exemplary operation of the vehicle light distribution control system.

A description will now be given of an operation of the vehicle light distribution control system 100 of the vehicle light made in accordance with the principles of the presently disclosed subject matter with reference to FIG. 14.

The following processing can be achieved by the detection ECU 40 and the LED control ECU 50 executing a predetermined program read in the respective memory units.

The process begins when the detection ECU 40 acquires data regarding vehicles from the sensor 30 at a predetermined timing (step S10). In this instance, the data may include images including surrounding vehicles such as an oncoming vehicle, a leading vehicle, and the like, distances from itself to the surrounding vehicles and the like. The detection ECU 40 then operates (or calculates) precise positions of the oncoming vehicle, the leading vehicle and the like and distances from itself to them on the basis of the acquired data regarding the relevant vehicles (step S12).

Next, the LED control ECU 50 generates designation data for designating an LED chip(s) to be turned off (or reduced in light intensity) on the basis of the operation results by the detection ECU 40 (including the positions of and the distances to the oncoming vehicle, the leading vehicle and the like) (step S14).

For example, if the operation results show that a surrounding vehicle(s) such as an oncoming vehicle, a leading vehicle and the like exits in an area shown as a solid black area in FIG. 11 (step S12), then the LED control ECU 50 generates designation data for designating the first LED chip 12R7, the second LED chip 22R7, the third LED chip 12L6, and the second LED chip 22L6 as LED chips to be turned off (or reduced in light intensity).

Then, the LED control ECU 50 controls the LED chips designated by the generated designation data so that the LED chips are to be turned off (or reduced in light intensity) (step S16).

For example, the LED control ECU 50 controls the first LED chip 12R7, the second LED chip 22R7, the third LED chip 12L6, and the second LED chip 22L6 designated by the designation data to turn off them or reduce light intensity from them.

In this manner, the first nearby illumination area PR7 and the first farther illumination area pR6 (as shown in FIG. 11A), and the second nearby illumination area PL6 and the second farther illumination area pL6 (as shown in FIG. 11B) are not illuminated or are illuminated with light with reduced light intensity. As shown in FIG. 12, the synthetic light distribution pattern P can thereby be formed in which a particular area where a surrounding vehicle such as an oncoming vehicle, a leading vehicle and the like exits (solid black area in FIG. 12) can be made darker than its surrounding areas. Accordingly, the vehicle light with this configuration can prevent glare light to the surrounding vehicles.

As described above, in accordance with the above exemplary embodiment the first nearby illumination areas PR1 to PR8, the first farther illumination areas pR1 to pR8, the second nearby illumination areas PL1 to PL8, and the second farther illumination areas pL1 to pL8 can be overlaid with one another so that the respective vertical division lines La, Lb, Lc, and Ld of the illumination areas appear in predetermined order in the horizontal direction (see FIG. 9C). Accordingly, the vehicle light with the above configuration can form the synthetic light distribution pattern P with an area being made darker than an area(s) surrounding that area by turning off a light (or reducing a light intensity) from a particular LED chip(s).

Furthermore, the first nearby illumination areas PR1 to PR8 and the second nearby illumination areas PL1 to PL8 can cover the wide illumination area ranging from the farther areas to the nearby areas as shown in FIGS. 9A and 9B. In addition, the first farther illumination areas pR1 to pR8 and the second farther illumination areas pL1 to pL8 that are smaller in size than the first nearby illumination areas PR1 to PR8 and the second nearby illumination areas PL1 to PL8 can cover the farther narrow area as shown in FIGS. 9A and 9B. Accordingly, the synthetic light distribution pattern made in accordance with the principles of the presently disclosed subject matter can allow the sufficient illumination range and center light intensity required for a running beam to be compatible.

Furthermore, the vehicle light with the above configuration can form the synthetic light distribution pattern P (see FIG. 12) with only an area where a farther surrounding vehicle exists being made dark by the action of the first farther illumination areas pR1 to pR8 and the second farther illumination areas pL1 to pL8 that are smaller in size than the first nearby illumination areas PR1 to PR8 and the second nearby illumination areas PL1 to PL8 (see FIGS. 9A and 9B). Specifically, the vehicle light with the above configuration can prevent areas other than the area where a farther surrounding vehicle exists from being darkened.

Furthermore, as described above, the vehicle light with the above configuration can form a synthetic light distribution pattern P with an area where a surrounding vehicle exists is made darker than an area(s) surrounding that area. The synthetic light distribution pattern P can thus allow a sufficient illumination range and a center light intensity required for a running beam to be compatible. A vehicle light with the above configuration can also form the synthetic light distribution pattern P with only an area where a farther surrounding vehicle exists being made dark. Specifically, the vehicle light with the above configuration can prevent areas other than the area where a farther surrounding vehicle exists from being darkened.

The vehicle light with the above configuration can also illuminate the first farther illumination areas pR1 to pR8 and the second farther illumination areas pL1 to pL8 with brighter light beams by the action of the second projection lens 23R and the fourth projection lens 23L having the second magnifying power smaller than the first magnifying power. Accordingly, the vehicle light can form the synthetic light distribution pattern P with a higher center light intensity suitable for a running beam.

Figure 1A:
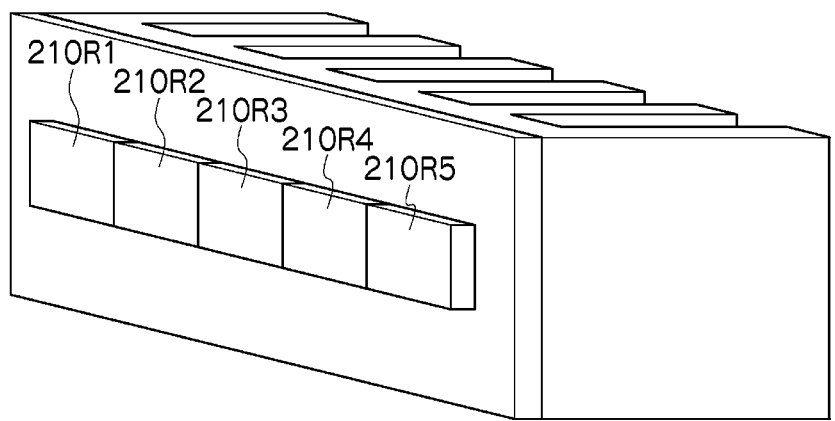
FIG. 1A is a perspective view illustrating a plurality of conventional light emitting devices 210R1 to 210R5 that are individually controlled to be lit.
Figure 1B:
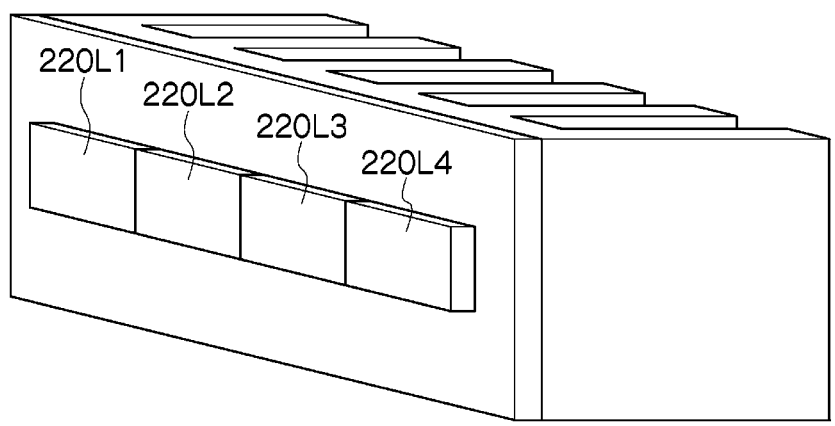
FIG. 1B is a perspective view illustrating a plurality of conventional light emitting devices 220L1 to 220L4 that are individually controlled to be lit.
Figure 2:
FIG. 2 is a table listing the position of a surrounding vehicle, and the relationships between a plurality of first areas PAR1 to PAR5 and a plurality of second areas PAL1 to PAL4, and respective additional light distribution patterns.

In the present exemplary embodiment, as the size of the projected images can be controlled by the respective projection lenses 13R, 23R, 13L and 23L, the LED chips (or the LED mounting substrate on which the LED chips are installed) can have the same configuration. Accordingly, when compared with the case where differently configured LEDs are required in a conventional vehicle light (as shown in FIGS. 1A and 1B), the manufacturing costs can be reduced.

Figure 15:
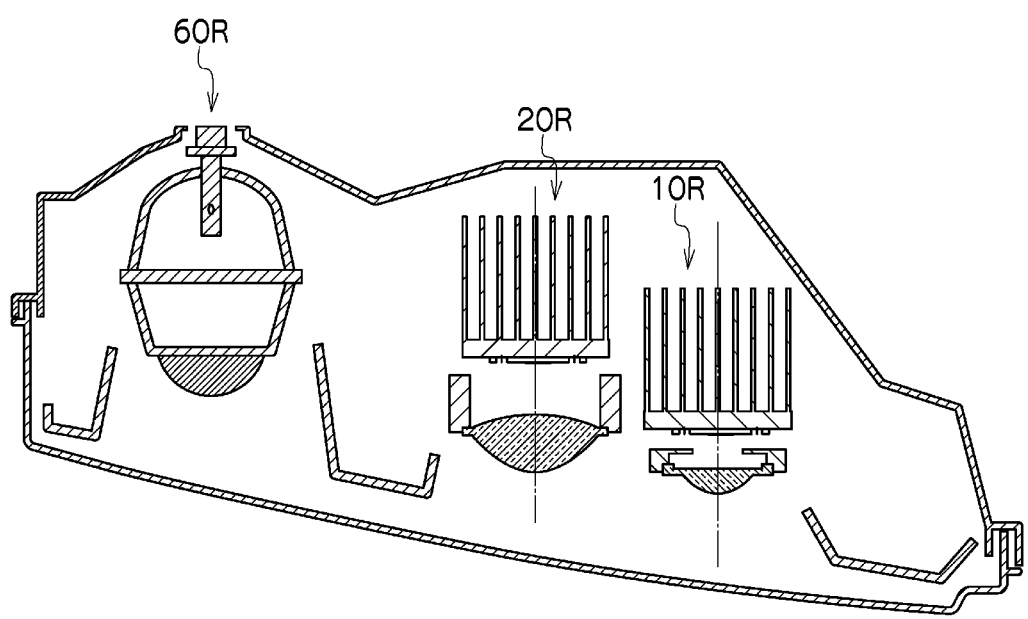
FIG. 15 is a cross sectional view describing a variation of the earlier embodiments.

It should be understood by a person skilled in the art that the vehicle light can be configured to include another optical unit 60 (FIG. 15) and the like in addition to the first nearby illumination unit 10R and the first farther illumination unit 20R (or the second nearby illumination unit 20R and the second farther illumination unit 20L).

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle light for forming a synthetic light distribution pattern including structure configured to provide a plurality of first nearby illumination areas that are divided horizontally and are individually controlled in terms of light intensity, a plurality of first farther illumination areas that are divided horizontally to have a smaller size than the first nearby illumination areas and are individually controlled in terms of light intensity, a plurality of second nearby illumination areas that are divided horizontally and are individually controlled in terms of light intensity, and a plurality of second farther illumination areas that are divided horizontally to have a smaller size than the second nearby illumination areas and are individually controlled in terms of light intensity, the respective illumination areas having vertical division lines as edges of respective areas, the first nearby illumination areas, the first farther illumination areas, the second nearby illumination areas, and the second nearby illumination areas being overlaid with one another so that respective vertical division lines of the illumination areas appear in predetermined order in a horizontal direction, wherein the structure includes:
a first nearby illumination unit configured to individually control light intensities of light beams for illuminating the respective first nearby illumination areas;
a first farther illumination unit configured to individually control light intensities of light beams for illuminating the respective first farther illumination areas;
a second nearby illumination unit configured to individually control light intensities of light beams for illuminating the respective second nearby illumination areas; and
a second farther illumination unit configured to individually control light intensities of light beams for illuminating the respective second farther illumination areas;

wherein the vehicle light further comprises a control unit;

wherein the first nearby illumination unit includes a plurality of first LED chips that are disposed horizontally and serve as light sources that are configured to be individually controlled for activation, and a first projection lens that is disposed in front of the plurality of first LED chips and is configured to project light source images of the first LED chips magnified by a first magnifying power;

wherein the first farther illumination unit includes a plurality of second LED chips that are disposed horizontally and serve as light sources that are configured to be individually controlled for activation, and a second projection lens that is disposed in front of the plurality of second LED chips and is configured to project light source images of the second LED chips magnified by a second magnifying power smaller than the first magnifying power;

wherein the second nearby illumination unit includes a plurality of third LED chips that are disposed horizontally and serve as light sources that are configured to be individually controlled for activation, and a third projection lens that is disposed in front of the plurality of third LED chips and is configured to project light source images of the third LED chips magnified by the first magnifying power;

wherein the second farther illumination unit includes a plurality of fourth LED chips that are disposed horizontally and serve as light sources that are configured to be individually controlled for activation, and a fourth projection lens that is disposed in front of the plurality of fourth LED chips and is configured to project light source images of the fourth LED chips magnified by the second magnifying power; and wherein the control unit is configured to individually control the plurality of first LED chips, the plurality of second LED chips, the plurality of third LED chips and the plurality of fourth LED chips.

2. A method for controlling a light distribution of a vehicle light, the method comprising:

providing a vehicle light including a first nearby illumination unit configured to individually control light intensities of light beams for illuminating respective first nearby illumination areas, a first farther illumination unit configured to individually control light intensities of light beams for illuminating respective first farther illumination areas, a second nearby illumination unit configured to individually control light intensities of light beams for illuminating respective second nearby illumination areas, and a second farther illumination unit configured to individually control light intensities of light beams for illuminating respective second farther illumination areas, each illumination unit including a plurality of LED chips disposed horizontally and which serve as light sources configured to be individually controlled for activation, and a projection lens that is disposed in front of the plurality of LED chips and is configured to project light source images of the LED chips;

acquiring data regarding a relevant vehicle at a predetermined timing, the data including at least one of an image of a relevant vehicle and a distance to the relevant vehicle;

calculating a precise position and a precise distance of the relevant vehicle based on the acquired data;

generating designation data for designating at least one LED chip of the illumination units based on calculation results including precise position and precise distance of the relevant vehicle;

controlling the at least one LED chip designated by the generated designation data so that the designated LED chip is turned off or reduced in light intensity, thereby dimming a corresponding illumination area among the first nearby illumination areas, the first farther illumination areas, the second nearby illumination areas, and the second farther illumination areas; and projecting light beams from respective LED chips so that a synthetic light distribution pattern formed by overlaying the first nearby illumination areas, the first farther illumination areas, the second nearby illumination areas, and the second farther illumination areas is thus controlled, wherein respective vertical division lines of the illumination areas appear in predetermined order in a horizontal direction.

3. A vehicle light for forming a synthetic light distribution pattern, comprising:

a first nearby illumination unit configured to control light intensity of light beams for illuminating a first nearby illumination area, the first nearby illumination area divided into horizontal regions;

a first farther illumination unit configured to control light intensity of light beams for illuminating a first farther illumination area, the first farther illumination area divided into horizontal regions;

a second nearby illumination unit configured to control light intensity of light beams for illuminating a second nearby illumination area, the second nearby illumination area divided into horizontal regions; and a second farther illumination unit configured to control light intensity of light beams for illuminating a second farther illumination area, the second farther illumination area divided into horizontal regions, wherein respective illumination areas have vertical division lines as edges of each of the areas, wherein the first nearby illumination area, the first farther illumination area, the second nearby illumination area, and the second farther illumination area are overlaid so that respective vertical division lines of the illumination areas appear in a predetermined order in a horizontal direction, wherein the first nearby illumination unit includes a plurality of first LED chips that are disposed horizontally and serve as light sources that are configured to be individually controlled for activation, wherein the first farther illumination unit includes a plurality of second LED chips that are disposed horizontally and serve as light sources that are configured to be individually controlled for activation, wherein the second nearby illumination unit includes a plurality of third LED chips that are disposed horizontally and serve as light sources that are configured to be individually controlled for activation, and wherein the second farther illumination unit includes a plurality of fourth LED chips that are disposed horizontally and serve as light sources that are configured to be individually controlled for activation, and wherein a control unit is configured to individually control the plurality of first LED chips, the plurality of second LED chips, the plurality of third LED chips and the plurality of fourth LED chips.

4. The vehicle light according to claim 3, wherein the first nearby illumination unit includes a first projection lens that is disposed in front of the plurality of first LED chips and is configured to project light source images of the first LED chips magnified by a first magnifying power, the first farther illumination unit includes a second projection lens that is disposed in front of the plurality of second LED chips and is configured to project light source images of the second LED chips magnified by a second magnifying power smaller than the first magnifying power, the second nearby illumination unit includes a third projection lens that is disposed in front of the plurality of third LED chips and is configured to project light source images of the third LED chips magnified by the first magnifying power, and the second farther illumination unit includes a fourth projection lens that is disposed in front of the plurality of fourth LED chips and is configured to project light source images of the fourth LED chips magnified by the second magnifying power.

* * * * *